(12) United States Patent
Han et al.

(10) Patent No.: US 7,375,821 B2
(45) Date of Patent: May 20, 2008

(54) PROFILOMETRY THROUGH DISPERSIVE MEDIUM USING COLLIMATED LIGHT WITH COMPENSATING OPTICS

(75) Inventors: Sen Han, Tucson, AZ (US); Erik K. Novak, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 503 days.

(21) Appl. No.: 11/003,538

(22) Filed: Dec. 3, 2004

(65) Prior Publication Data
US 2006/0119862 A1   Jun. 8, 2006

(51) Int. Cl.
*G01B 11/02*   (2006.01)
(52) U.S. Cl. ...................................... 356/497
(58) Field of Classification Search ................ 356/489, 356/495, 511–515, 521, 497
See application file for complete search history.

(56) References Cited

U.S. PATENT DOCUMENTS

| | | | | |
|---|---|---|---|---|
| 3,668,406 A | * | 6/1972 | Reid et al. ................ | 356/521 |
| 4,652,130 A | * | 3/1987 | Tank ........................ | 356/455 |
| 6,490,046 B1 | * | 12/2002 | Drabarek et al. .......... | 356/489 |
| 2003/0011784 A1 | * | 1/2003 | De Groot et al. ......... | 356/512 |
| 2004/0036838 A1 | * | 2/2004 | Podoleanu et al. ....... | 351/206 |

OTHER PUBLICATIONS

"Pellicle." The American Heritage Dictionary of the English Language, 4th ed. Boston: Houghton Mifflin, 2000. www.barleby.com/61/. Jun. 5, 2007. A thin skin or film, such as an organic membrane or liquic film.*

* cited by examiner

*Primary Examiner*—Patrick Connolly
*Assistant Examiner*—Scott M Richey
(74) *Attorney, Agent, or Firm*—Antonio R. Durando

(57) ABSTRACT

A collimated light is used in combination with a compensation element and an aberration-corrected objective with a long working distance to produce a greatly improved fringe contrast in the measurement of a sample surface through a dispersive element. When the dispersive element consists of a fixed cover with substantially consistent characteristics from sample to sample, the compensation element is a plate that matches the optical characteristics of the dispersive element. When the dispersive element varies, the compensation element consists of a variable-thickness transmissive element embodied in a pair of half-cube prisms is adapted to slide along the beam-splitting plane, thereby permitting the adjustment of the optical path-length through the splitter in the reference-beam direction while retaining unchanged the optical path-length in the test-beam direction.

37 Claims, 10 Drawing Sheets

PROFILOMETRY THROUGH DISPERSIVE MEDIUM USING COLLIMATED LIGHT WITH COMPENSATING OPTICS

BACKGROUND OF THE INVENTION

1. Field of the Invention

This invention pertains to the general field of optical profilometry and, in particular, to interferometric measurements conducted through a transmissive medium.

2. Description of the Prior Art

Interferometric optical systems are widely used to measure surface features because of their speed, accuracy and flexibility. As is well understood in the art, conventional phase shifting interferometry (PSI) requires that the surface of the test sample being profiled be quite smooth, so that continuous interference fringes are obtained and so-called "phase ambiguities" are avoided. Various kinds of "phase unwrapping" algorithms are used to track phase over a large range of surface heights in order to resolve phase-ambiguity errors. With single-wavelength techniques, the maximum surface roughness is limited to approximately $1/100^{th}$ the wavelength of the light used and step-height measurements are limited to steps no greater than approximately one eight the wavelength. Vertical scanning interferometry (VSI), in which white-light interference fringes are demodulated to find the peak amplitude of an envelope of the fringes to determine the height value at the peak interference fringe, is preferably used to produce area profiles of rough surfaces with height variations exceeding the measurement range of single-wavelength techniques. VSI provides the advantage of producing rapid results without the need for phase-unwrapping algorithms.

Interferometric profilers based on these techniques are used in particular to measure micro-electro-mechanical systems (MEMS). MEMS integrate mechanical elements, sensors, actuators, and electronics on a common silicon substrate through microfabrication technology. By combining silicon-based microelectronics and micromachining technology in MEMS, it is now possible to realize complete on-a-chip systems that promise to revolutionize nearly every product category.

MEMS devices are manufactured using batch fabrication techniques similar to those used for integrated circuits and quality control is a key to making a successful product. Since approximately 80% of the total cost of MEMS production resides in packaging and testing, accurate metrology of the devices is essential for commercial success. Moreover, the devices need to be tested in their final packaged state, typically underneath a protective surface such as glass, plastic, or sapphire, which is an essential component of the packaged product. These transmissive fixed media often degrade the interferometric measurement because of dispersion and aberration effects. For example, the top portion of FIG. 1 shows the clear image of a pitch standard on a mirror surface produced by a conventional interferometric profiler and the top portion of the figure illustrates the high-contrast fringes produced by tilt in the mirror. By contrast, FIG. 2 illustrates the barely visible image of the pitch standard and the interferometric fringes produced by the same profiler after the introduction of a transmissive layer in the optical path of the test beam. Clearly, the image and the corresponding fringes acquired in conventional manner are not suitable for meaningful analysis of a sample that includes a transparent window. Moreover, longer working-distance optics are required to accommodate the additional distance to the test surface when such a protective layer and a beam splitter are present in the sample.

In addition to packaged MEMS devices, other parts requiring precision metrology also warrant the ability to obtain data through dispersive media. These include parts placed in an environmental chamber to study the effects of pressure, temperature, humidity and reactants on the sample. Also, some parts are used while immersed in a liquid medium, including objects used in biology and ink-jet printing, and hard-drive sliders which fly through a lubricating medium. Performing high lateral-resolution metrology on such parts cannot be accomplished using conventional methods.

Thus, when such a transmissive fixed layer is present in the path of the measurement beam of an interferometric profiler, an equivalent compensation element in the path of the reference beam has been used in the past to minimize the dispersion, aberration and interference effects of the transmissive layer. While this solution is normally acceptable for low magnification systems (less than about 10×), it has been found to be unacceptable at higher magnifications where all systems defects tend to become more and more significant. Even the use of an objective specifically corrected for the aberrations introduced by the transmissive layer was surprisingly found not to improve significantly the quality of the fringes produced by conventional interferometric profilers. Therefore, existing interferometric techniques need to be improved to measure sample surfaces lying underneath transmissive fixed materials. The present invention provides various solutions to that end.

BRIEF SUMMARY OF THE INVENTION

This invention is based on the discovery that the use of substantially collimated light in combination with a compensation element and an aberration-corrected objective with a long working distance produces a greatly improved fringe contrast in the measurement of a sample surface through a dispersive layer. According to one aspect of the invention that is particularly suitable for quality-control testing of products where the dispersive layer consists of a fixed cover with substantially consistent characteristics from sample to sample, the compensation element is selected so as to match the optical characteristics of the dispersive layer (such as a slide cover). In addition, the light beam is substantially collimated before it is directed to the sample and reference surface. If necessary, the objective is also corrected for the aberrations produced by the dispersive layer and the compensation element.

According to another aspect of the invention, the compensation element consists of, or is used in conjunction with, a variable-thickness transmissive element adapted to match the physical properties of the dispersive layer overlaying the sample surface. Such a variable-thickness transmissive element is preferably embodied in a beam-splitting assembly or cube wherein each half-cube prism is adapted to slide along the beam-splitting plane, thereby permitting the adjustment of the optical path-length through the cube in the reference-beam direction while retaining unchanged the optical path-length in the test-beam direction, or vice versa. Another embodiment could encompass an electrically actuated optical element, such as a liquid crystal device, the dispersion properties of which can be changed electrically to match the dispersive media in the test beam.

The invention may be implemented either as a dedicated system or as a retro-fit component to be used with a conventional interferometric profiler. Such a component includes a reference surface, a compensation element, an illumination source, a beam-slitter to produce a reference and test beams, and an objective adapted to produce a substantially collimated light beam directed to the beam-splitter. The component of the invention is combined with imaging and data acquisition systems of conventional interferometric profilometers.

Various other aspects and advantages of the invention will become clear from the description that follows and from the novel features particularly recited in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

DETAILED DESCRIPTION OF THE INVENTION

This invention is based on a combination of elements found to be surprisingly useful in improving the image of a sample surface measured through a transmissible medium. Accordingly, it is anticipated that the invention will be particularly useful for the rapid testing of packaged products wherein the surface of interest is optically accessible only through a dispersive layer, such as in the case of MEMS devices under a protective cover glass or a sample under a fluid layer.

As used herein, "compensating element" refers to any transmissive component introduced in the optical path of the reference beam of an interferometric profiler in order to compensate for the dispersion, coherence and interference effects of a dispersive element introduced in the optical path of the test beam. Such a compensation element may consist of a single optical component or of multiple components optically coupled to produce a desired effect. The term "dispersive element" is used to refer to any transparent substance or cover on a sample surface in the optical path of a test beam of a profiler used to measure the surface. Such dispersive elements may also be referred to as transmissive plates in the description of the invention. The term "plate" is intended to encompass any shape of such dispersive elements, whether or not it approximates the actual geometry of a plate, and can include compound elements such as a fluid cell containing a liquid sandwiched between two layers of glass or plastic. The term "half-cube" is used to refer to a prism having the geometry of a half cube that results from splitting a cube along a diagonal plane. In addition, any parallelepiped or other prism capable of producing the effects of the half-cubes described herein is similarly referred to as a half-cube for the purposes of the invention.

Figure 3:
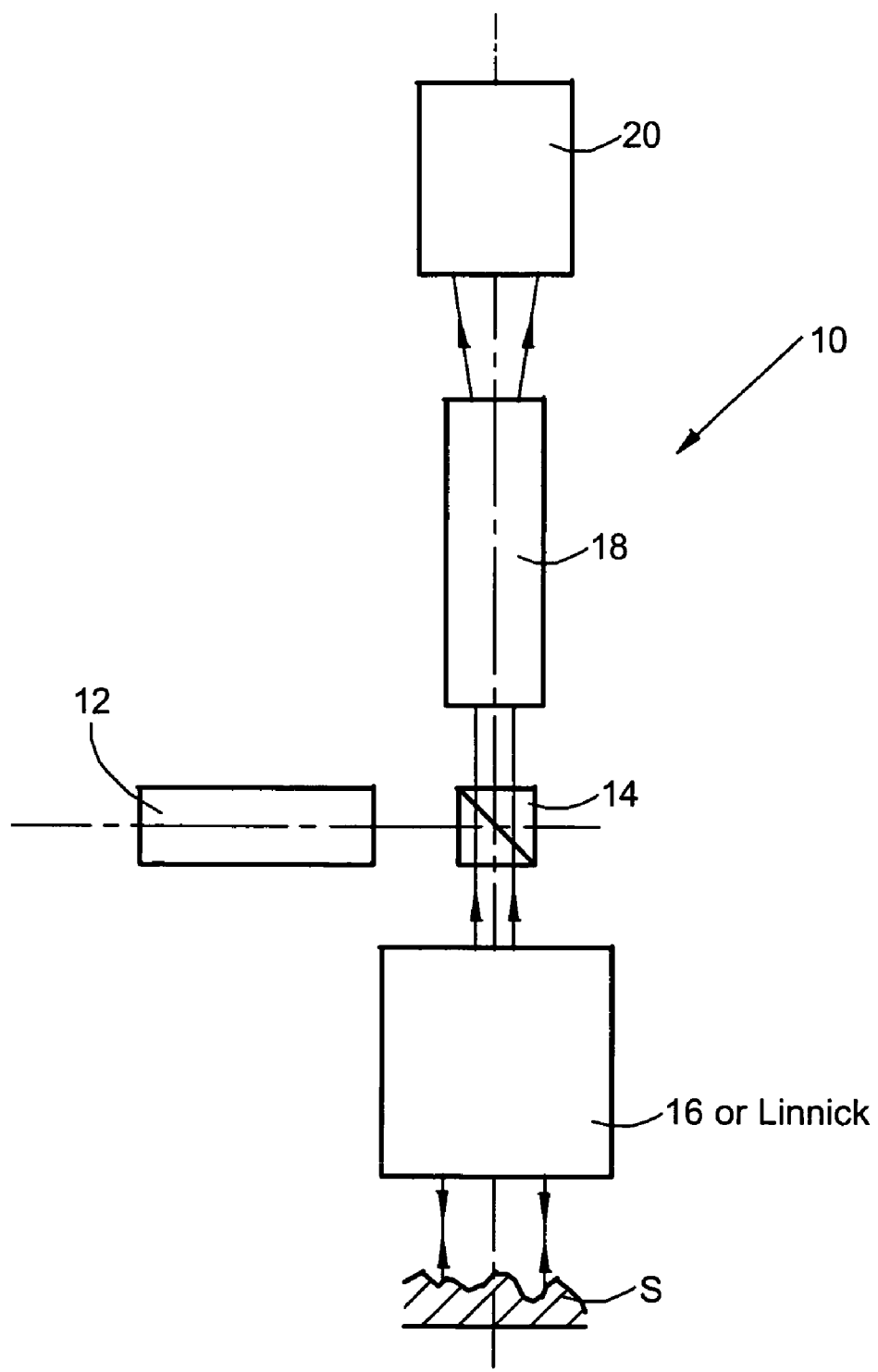
FIG. 3 is a schematic representation of a conventional interferometric profiler.

Referring to the figures, wherein like parts are referenced with the same numerals and symbols, FIG. 3 illustrates schematically a conventional interferometric profiler 10. An illumination system 12 produces a light beam directed toward a beam-splitter 14, which in turn reflects it toward an interferometric microscope objective 16, preferably of Linnik, Mirau or Michelson configuration. As is well understood in the art, the light beam is split in the objective into a test beam illuminating a sample surface S and a reference beam directed toward a reference surface normally contained within the objective 16 (not shown in the figure). The test and reference beams are reflected back through the objective 16 and the beam-splitter 14 into an imaging system 18 and a camera or other light sensing device 20 for data acquisition. A monitor (not shown) is typically used to view the images detected by the camera 20. A focusing and scanning mechanism (also not shown) is used to focus the sample image and to vary the optical path difference between the two beams and produce the interferometric fringes used to measure the test surface S. Finally, a computer system (not shown) is connected to the camera and the focus and scanning mechanism to control the focusing process, the interferometric scan, the data acquisition steps, and to perform analysis of the fringes produced by the scan.

Figure 4:
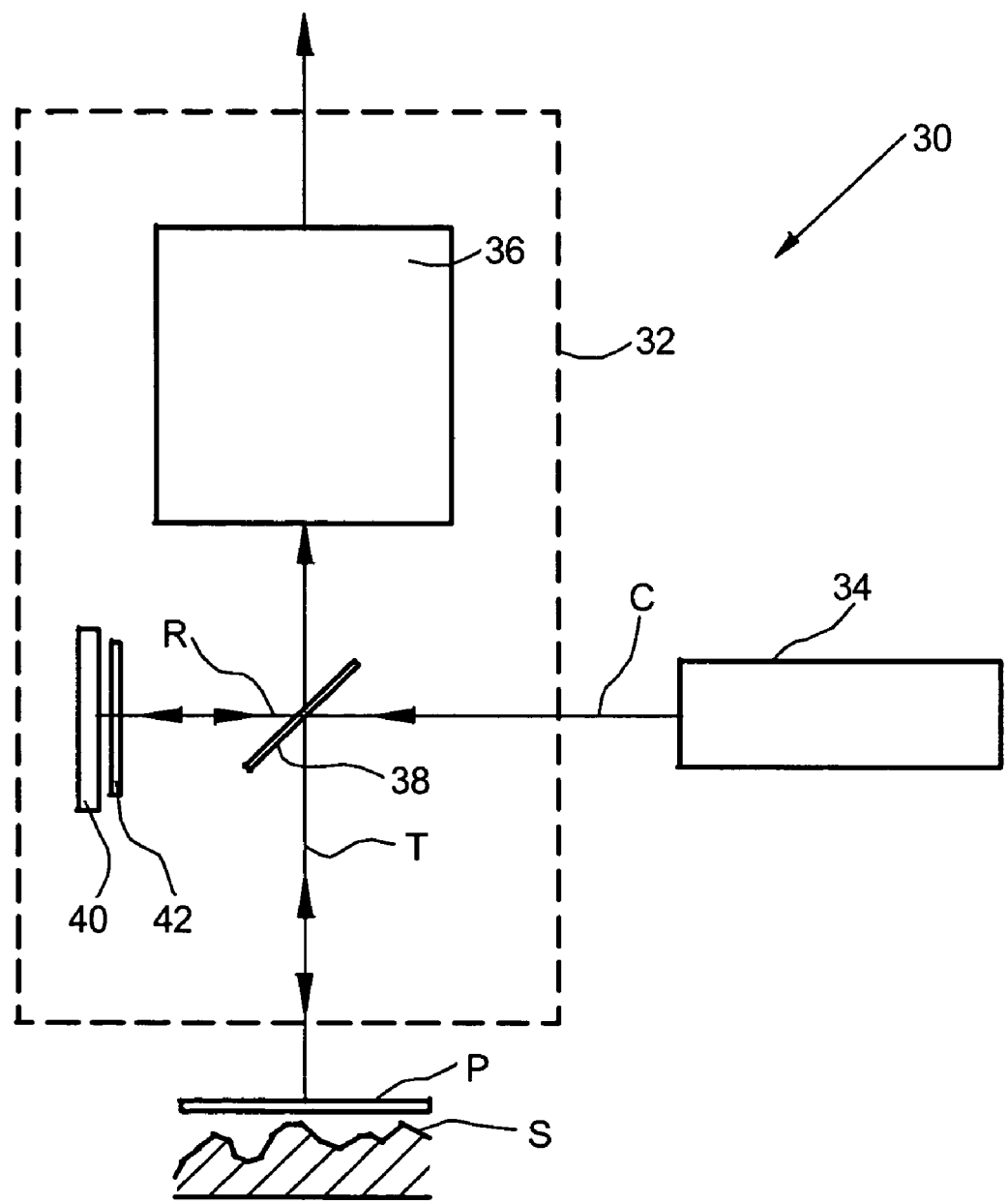
FIG. 4 is a schematic representation of an interferometric system according to the present invention, wherein a compensating element and a collimated light beam are combined to minimize the effects of a dispersive plate present in the optical path of the test beam of an interferometric profiler.

FIG. 4 illustrates schematically the basic components of the present invention in a system configuration 30 suitable for replacement of the objective 16 in a conventional interferometric profiler (such as shown in FIG. 3). The system 30 is judiciously designed to optimize a conventional profiler's performance when used to test a sample surface S covered by a dispersive element P (such as a glass plate) in the optical path of the test beam T. Accordingly, the system 30 includes an objective module 32 intended for replacement of the standard objective 16 in a conventional profiler and a separate illumination module 34. The objective module includes an objective 36 that is corrected for the aberrations expected to be introduced by the dispersive element P and is adapted for alignment along the optical path of the conventional objective 16 it replaces. The illumination module 34 is capable of delivering a substantially collimated light beam C to a beam-splitting element 36 (in the module 32) that is adapted to produce the test beam T directed to the sample surface S and a reference beam R directed to a reference surface 40. In addition, a transmissive compensating element 42, selected to essentially match the optical properties of the dispersive element P, is placed in front of the reference surface in order to compensate for the optical effects of the plate P. The splitter element 38 is preferably a pellicle in order to minimize aberration and the effects of imperfections in the collimation of the light impinging on the beamsplitter. The working distance of the objective 36 has to be sufficiently long to accommodate the presence of the splitter 38 and a correspondingly extended housing between the objective and the exterior sample to be tested, including the thickness of the dispersive element P.

Figure 5:
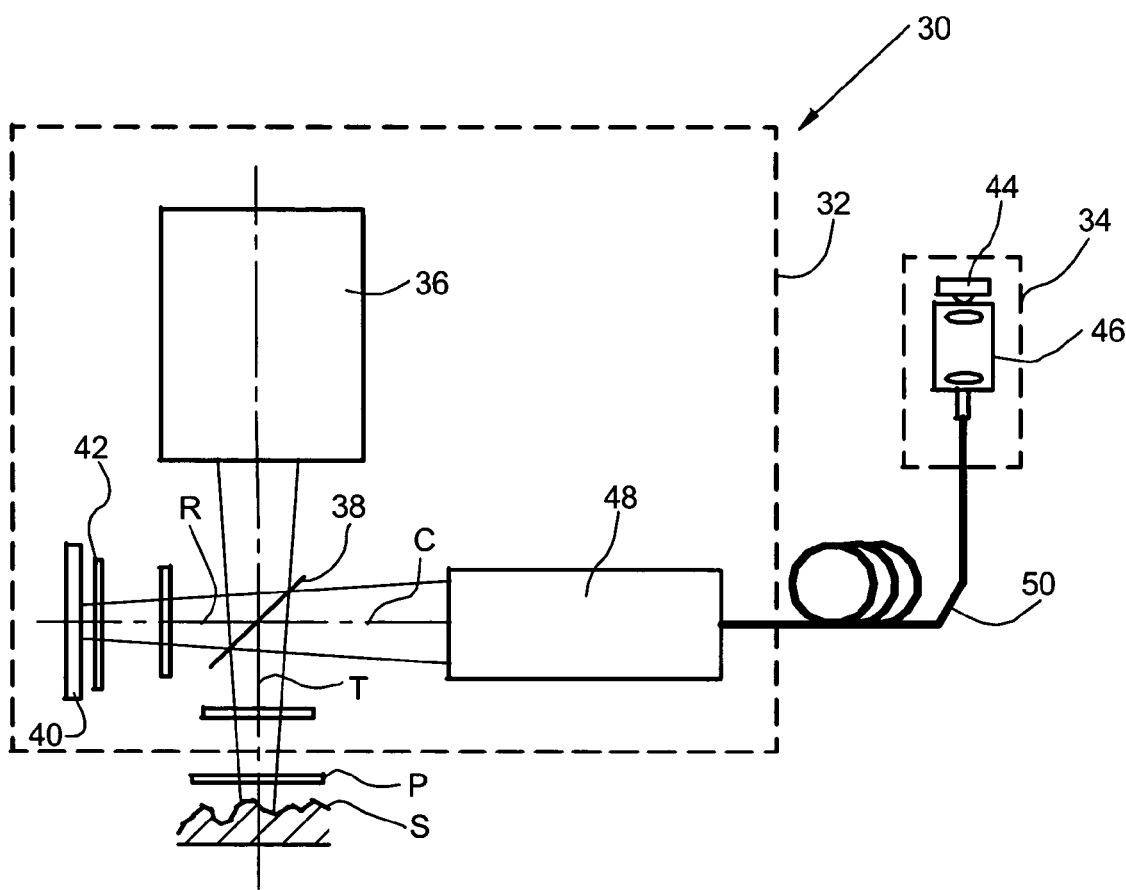
FIG. 5 is a more detailed schematic view of the system of FIG. 4.
Figure 6:
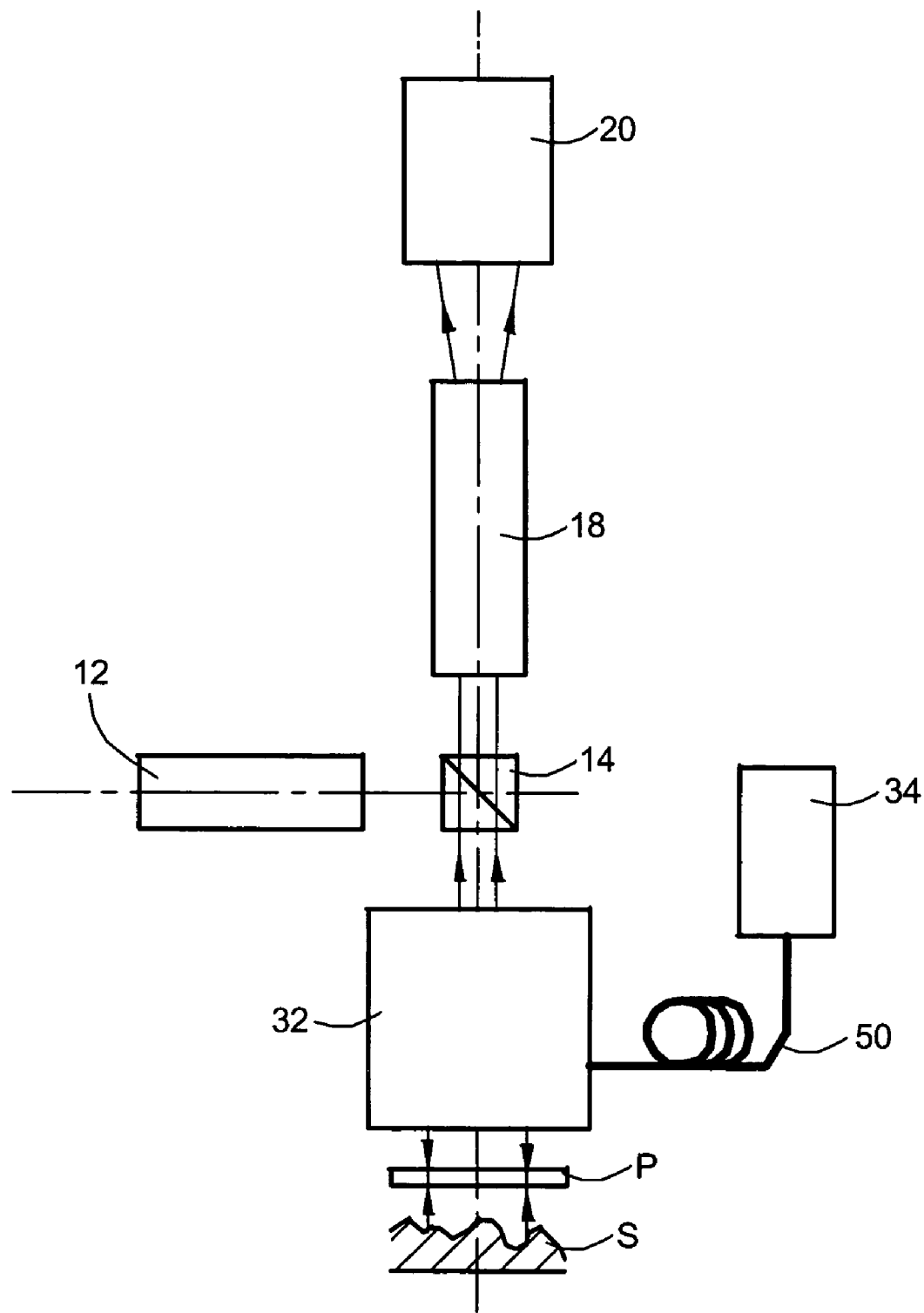
FIG. 6 illustrates the system of FIG. 5 coupled to the conventional optical profiler of FIG. 3 after displacement of the original interferometric objective.

In practice, as illustrated in FIG. 5, the illumination module 34 is preferably implemented using a conventional light source 44 (such as an LED, a standard filament-based bulb, a superluminescent diode) combined with a system of optics 46, 48, both within the light source and the objective module 32, designed to produce a substantially collimated beam C at the splitter 38. An optical fiber 50 is preferably used to connect the illumination and objective modules. FIG. 6 illustrates a conventional profiler, such as shown in FIG. 3, wherein the objective has been replaced by the module 32 of the invention and the illumination module 34 is connected as shown in FIG. 5.

Figure 1:
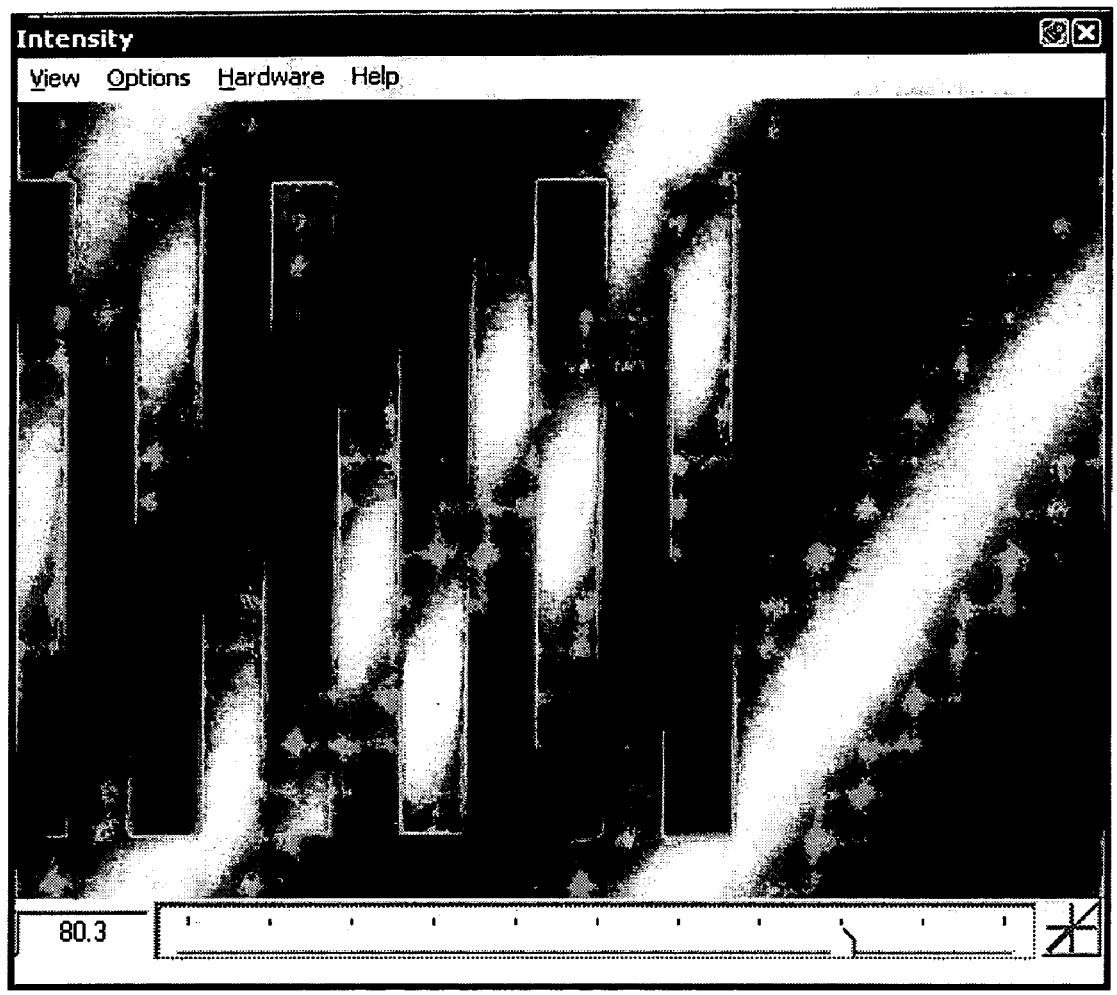
FIG. 1 is the image of a pitch standard on a mirror surface taken with a conventional profilometer.
Figure 2:
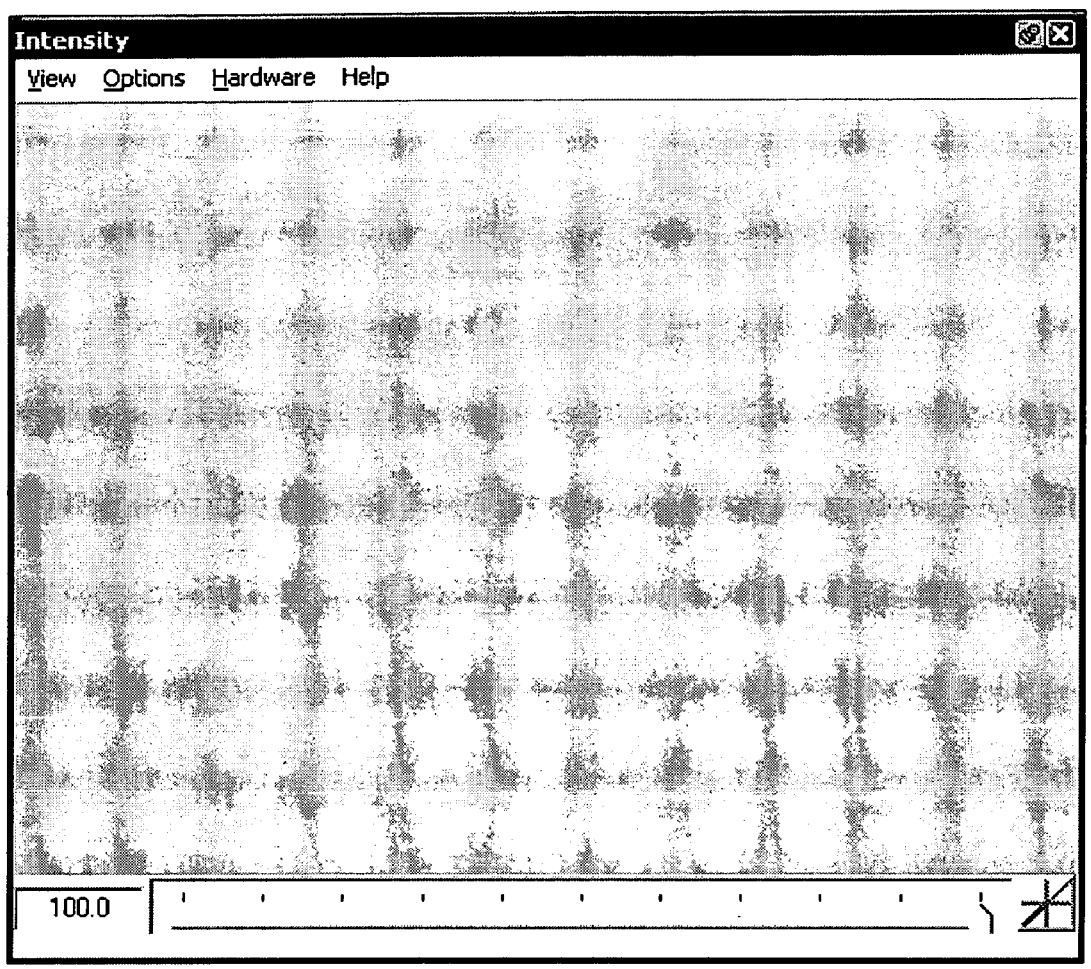
FIG. 2 is the image of the pitch standard on the mirror surface of FIG. 1 taken with the same conventional profilometer after a dispersive plate is introduced in the optical path of the test beam.
Figure 7:
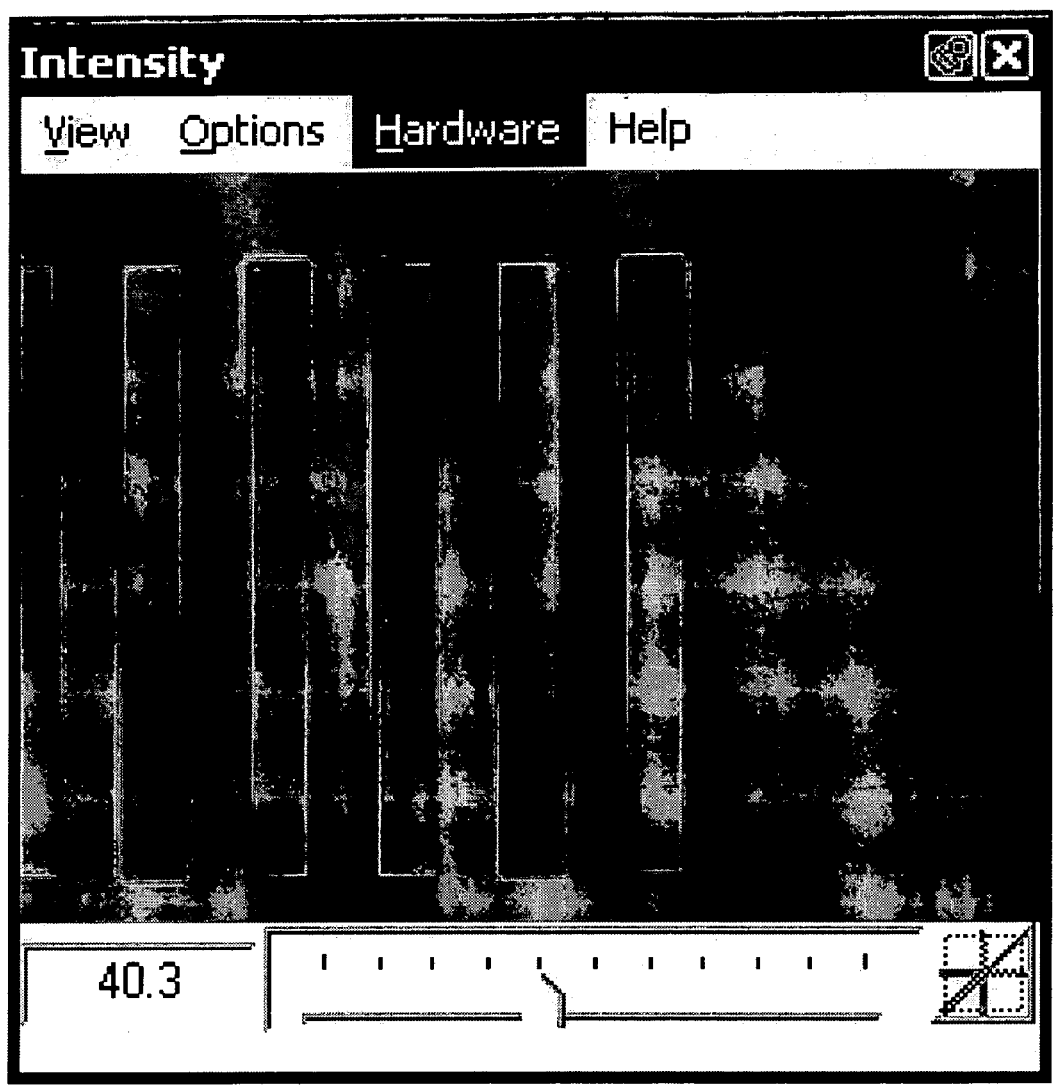
FIG. 7 is the image of the same mirror surface of FIG. 2 (including the dispersive plate) taken with the profilometer illustrated in FIG. 6.

In operation, the collimated beam C is split by the splitter 38 into two beams T and R that remain substantially collimated as they pass through the dispersive element P and element 42, respectively. This feature of the invention was found to enable the testing of samples that include a transmissive cover plate at magnifications greater than 10×, which previously had been impossible to achieve with precision irrespective of efforts put forth to match the compensating element 42 to the dispersive element P and to correct the objective 36 for the aberrations and dispersion created by the plate. We found that only the combination of a compensating element and these corrective factors with substantially collimated reference and test beams makes it possible to improve the quality of the images and fringes sufficiently to permit analysis of a covered sample surface at such larger magnifications. FIG. 7 is an image of the same sample of FIG. 2 taken with the same profiler after the original objective is replaced by the system 30 of the invention. As the figure shows, the clarity of the pitch-standard image and the contrast of the interferometric fringes are comparable to those of FIG. 1, where the same sample surface was measured without the protective cover by the same optical profiler with the original objective. This result is not attainable without the combination of corrective elements disclosed above.

Figure 8:
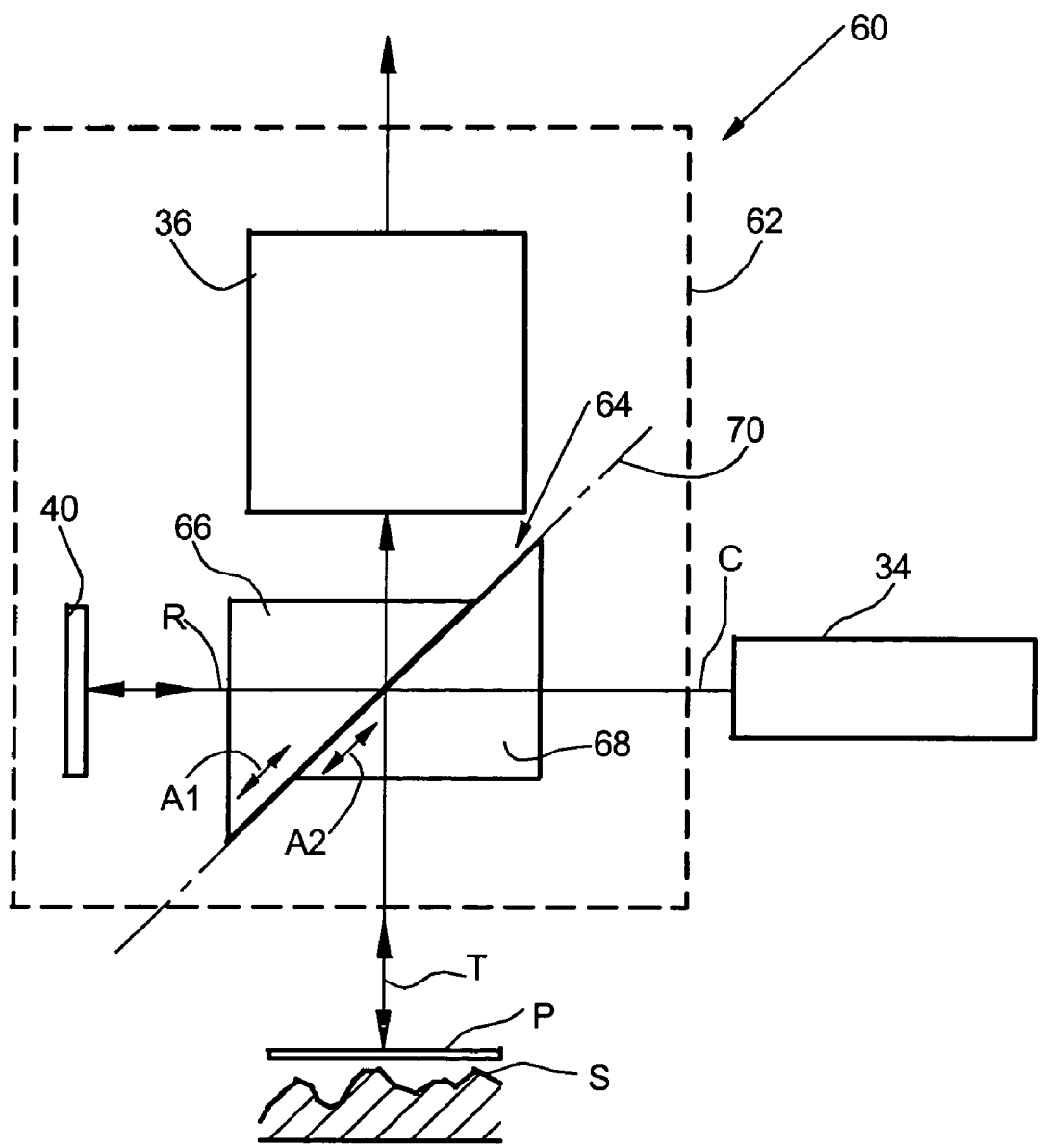
FIG. 8 is a schematic view of another embodiment of the invention wherein the compensating element is incorporated into the beam-splitting optics in the objective module of the invention.

Another corrective system 60 according to the invention, particularly suited for applications wherein the protective glass P of the sample may vary in thickness, is illustrated in FIG. 8. The objective module 62 of the system 60 is modified so as to allow the adjustment of the thickness of the compensating element of the invention to match the thickness of the transmissive plate P covering the sample surface S. This is achieved by combining the beam-splitter 38 and the compensating element 42 of FIG. 4 into a single component, a compensating/beam-splitting assembly 64. The assembly 64 preferably consists of a pair of prisms 66, 68 (preferably half-cube prisms) slidably coupled through a beam-splitting interface adapted to split the incoming beam C into the test beam T directed toward the sample surface S and the reference beam R directed to the reference surface 40. Because of the slidable relation between the two prisms at the beam-splitting plane 70, the relative position of the two prisms can be varied so as to produce an optical path length of the reference beam R through the prism 66, 68 equal to the optical path length of the test beam T through the prisms and the dispersive element P. As one skilled in the art would readily understand, this may be achieved either by displacing both prisms to different degrees so as to obtain the desired result, as illustrated by the arrows A1 and A2 in the figure, or by displacing only one of the prisms while the other prism is kept stationary. This feature provides a simple mechanism for matching the overall thickness of the transmissive elements in both paths (including the plate P), thereby enabling correction for plates P of different thickness.

The beam-splitting function of the assembly 64 may be achieved conveniently by coating either prism with a 50/50 splitting coating (or any combination of reflectivities it may be desirable to have, such as a 60/40 or other ratio, depending on the sample reflectivity) and the other prism with an AR coating at the interface between the two prisms 66, 68. Thus, the collimated beam produced by the illumination module 34 is partly reflected toward the sample surface S (the test beam T) and partly transmitted toward the reference surface 40 (reference beam R). Upon reflection from these surfaces, both the test and reference beams are again in part transmitted and reflected, respectively, toward the objective 36 and the imaging optics of the system (not shown in the figure). Therefore, about one quarter of the illumination entering the objective module 62 is finally passed through the objective 36, which requires appropriate design of the illumination module 34 to ensure sufficient light reaches the detector.

Figure 9:
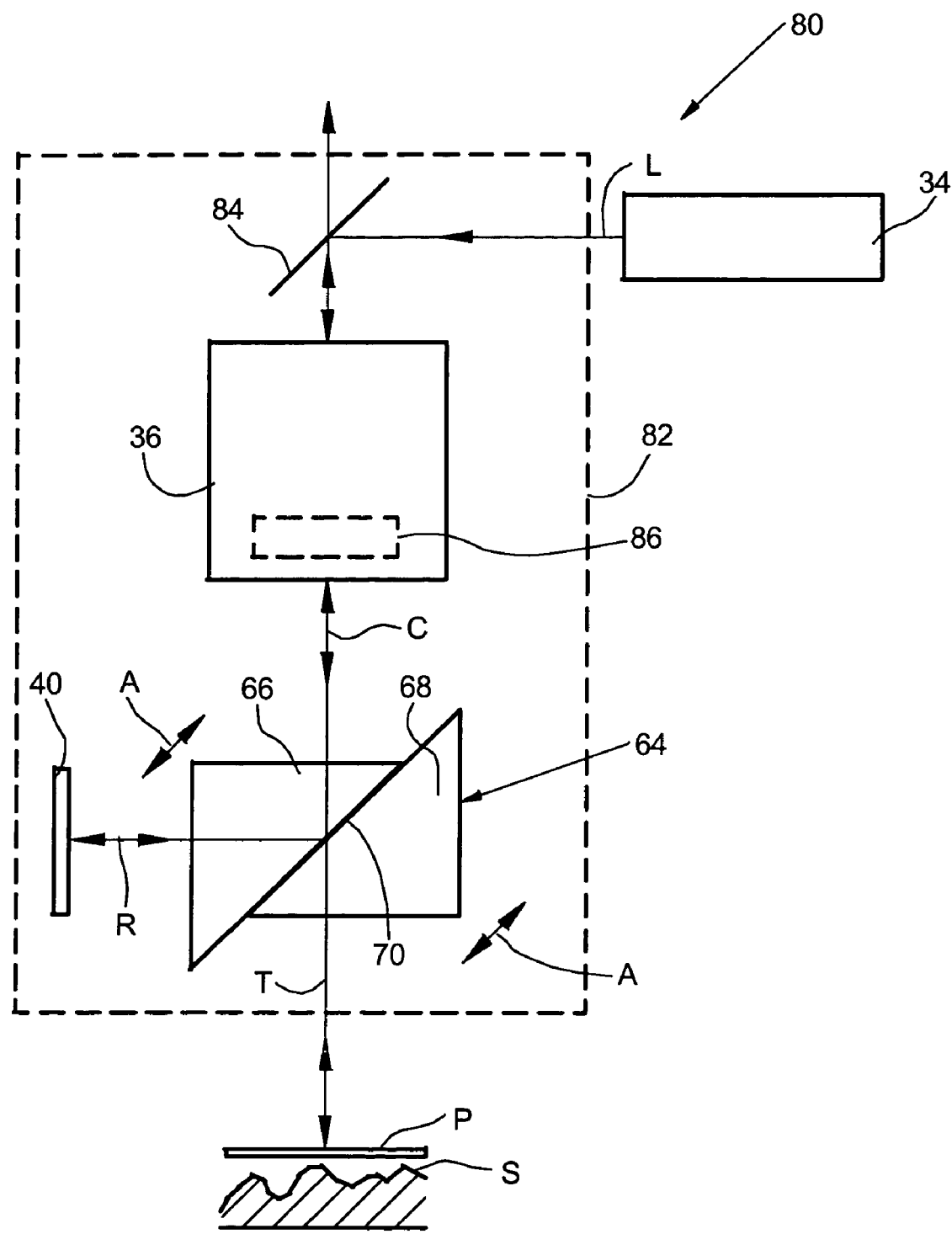
FIG. 9 is another embodiment of the invention of FIG. 8 wherein the illumination beam is coupled to the objective module via a beam-splitter reflecting the beam toward the objective and additional optics are used to produce collimated test and reference beam.

As illustrated in FIG. 9, a similar embodiment 80 of the invention is implemented by feeding the light from the illumination source 34 from above the objective 36. In this case, the objective module 82 includes an additional beam-splitter 84 directing a portion of the light L produced by the illumination module toward the prism assembly 64 through the objective 36. According to the invention, the optics of the illumination source are judiciously selected so as to produce a substantially collimated beam C as the light reaches the prism assembly 64. Additional optics 86 may be used also within the objective module 82, if necessary to produce collimation of the beam C.

As in the case of FIG. 8, the assembly 64 preferably consists of a pair of half-cube prisms 66, 68 slidably coupled and adapted to split the incoming beam C into the test beam T directed toward the sample surface S and the reference beam R directed to the reference surface 40. Again, because of the slidable relation between the two prisms at the beam-splitting plane 70, the relative position of the two prisms can be varied so as to produce an optical path length for the reference beam R through the prism 66 that is equal to the optical path length of the test beam T through the prisms 66, 68 and the dispersive element P. This result may be achieved either by displacing both prisms or by displacing only one of the prisms while the other is kept stationary.

In the embodiment of FIG. 9, the beam-splitting function of the assembly 64 may again be achieved by coating either prism with a 50/50 splitting coating and the other prism with an AR coating at the interface between the two prisms. Accordingly, the collimated beam C is partly transmitted toward the sample surface S (test beam T) and partly reflected toward the reference surface 40 (reference beam R). Upon reflection from these surfaces, both the test and reference beams are again in part transmitted and reflected, respectively, toward the objective 36 and the imaging optics of the system (not shown). Because the optical path of the reference beam is a constant, the reference surface needs to be aligned just once. As a result of the additional beam-splitter 84 used in this configuration, only about six percent of the illumination L entering the objective module 82 is finally passed through the objective 36. Therefore, very special care must be taken in the design of the illumination system to ensure that sufficient light is provided to produce acceptable contrast at the detector.

Figure 10:
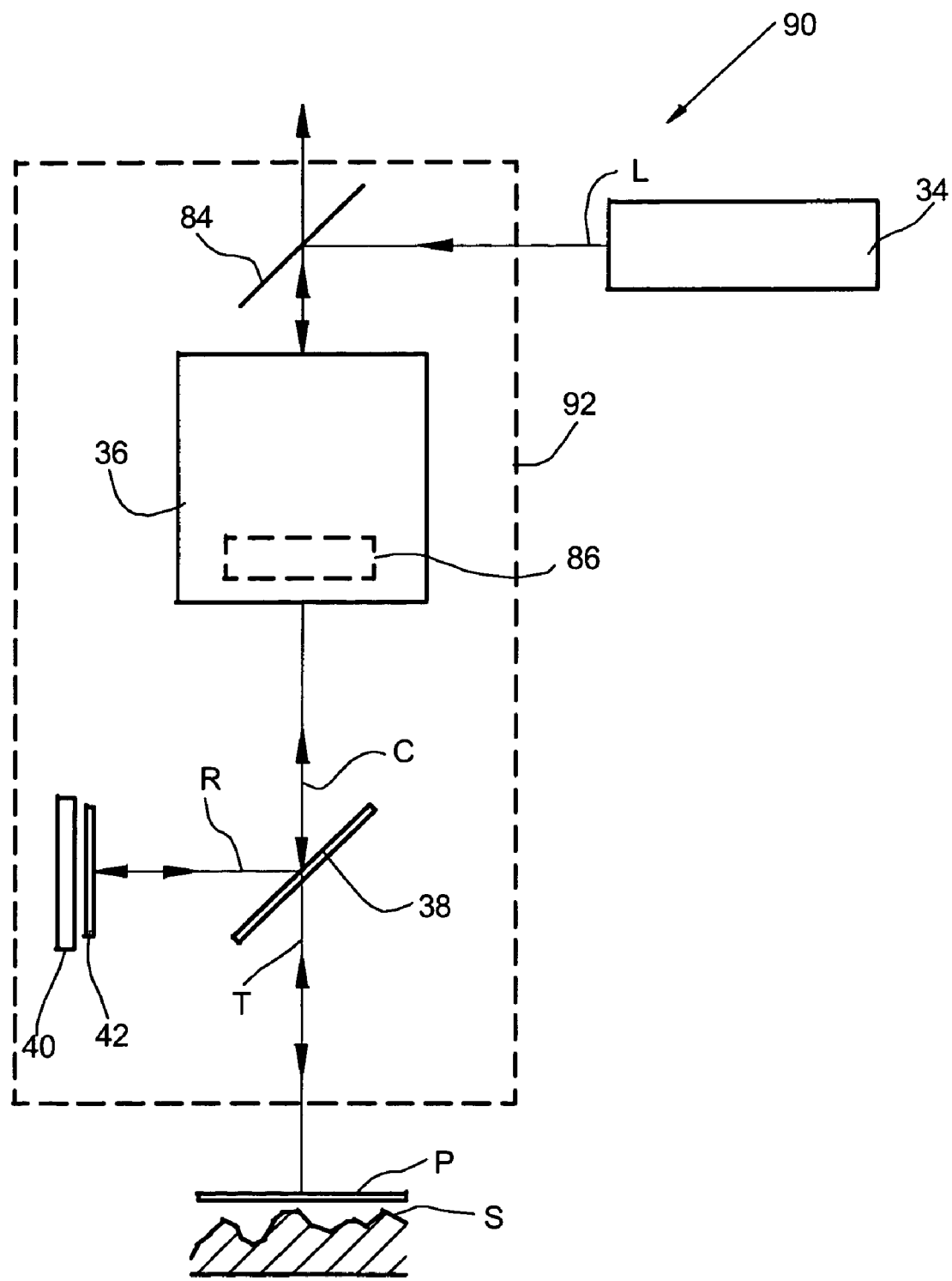
FIG. 10 is yet another embodiment of the invention wherein the illumination system of FIG. 9 is used in the system of FIG. 4.

FIG. 10 illustrates a system 90 for fixed-thickness cover plates P wherein the illumination configuration of FIG. 9 is combined with the compensating arrangement of FIG. 4. Also in this case only about six percent of the illumination L entering the objective module 92 is finally passed through the objective 36 toward the imaging system and very special care in the design of the illumination system is required to produce sufficient contrast at the detector.

Thus, it is clear that the invention is based on the idea of combining a substantially collimated beam with a compensating element in an objective module to allow measurement of surfaces covered by a transmissive protective plate. It is understood that the invention could be practiced as described or using alternative forms of compensating elements or beam-splitting elements. For instance, a cube or plate could be used instead of the pellicle 38 described in FIGS. 4 and 10, or the compensating element 42 could be an electrically or mechanically variable material that changes its optical properties based on an external stimulus, such as a liquid crystal, an acousto-optic device, or a variable-volume fluidic element.

Therefore, it is clear that various changes in the details and steps that have been described may be made by those skilled in the art within the principles and scope of the invention herein illustrated and defined in the appended claims. Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. A corrective system for optical profilometry of a sample surface covered by a protective dispersive element that is added to cover the sample surface being profiled, the system comprising:
   an objective module including an objective suitable for coupling to an interferometric imaging system, said objective module being adapted to produce a test beam directed toward said sample surface and a reference beam directed toward a reference surface, and including means for producing substantial collimation of said reference beam as it impinges on the reference surface and of the test beam as it impinges on the sample surface;
   a compensating element placed along an optical path of said reference beam toward said reference surface, said compensating element being a separate component from the reference surface and having optical dispersive properties designed to substantially compensate corresponding dispersive properties of said protective dispersive element; and
   an illumination module optically coupled to said objective module.

2. The corrective system of claim 1, wherein said objective is corrected for aberrations produced by said dispersive element.

3. The corrective system of claim 1, wherein said objective module includes a beam-splitting element receiving a substantially collimated beam from said illumination module and producing said test and reference beams.

4. The corrective system of claim 1, wherein said objective module includes a pellicle to produce said test and reference beams.

5. The corrective system of claim 1, wherein said illumination module is optically coupled to the objective module by an optical fiber.

6. The corrective system of claim 1, wherein said objective is corrected for aberrations produced by said dispersive element; said objective module includes a beam-splitting element receiving a substantially collimated beam from said illumination module and producing said test and reference beams; said beam-splitting element includes a pellicle; and said illumination module is optically coupled to the objective module by an optical fiber.

7. The corrective system of claim 1, wherein said compensating element is incorporated into a beam-splitting assembly that produces said test and reference beams, and said assembly comprises a pair of prisms sharing a face along a beam-splitting plane such that any displacement of either of said prisms along said plane produces a change in said optical properties designed to substantially match corresponding properties of said dispersive element.

8. The corrective system of claim 7, wherein said prisms are half-cube prisms.

9. The corrective system of claim 1, wherein said illumination module is optically coupled to said objective module through a beam-splitter reflecting an input beam toward said objective to produce substantially collimated reference and test beams.

10. The corrective system of claim 7, wherein said illumination module is optically coupled to said objective module through a beam-splitter reflecting an input beam toward said objective to produce substantially collimated reference and test beams.

11. The corrective system of claim 1, wherein said compensating element comprises a device with variable optical properties to compensate optical effects produced by said dispersive element, said variable optical properties being responsive to an external stimulus.

12. The corrective system of claim 11, wherein said device includes a liquid crystal device and said external stimulus is an electrical signal.

13. The corrective system of claim 11, wherein said device includes an acousto-optic device and said external stimulus is an electrical signal.

14. The corrective system of claim 1, wherein said sample surface is a micro-electro-mechanical-systems device.

15. The corrective system of claim 1, wherein said dispersive element includes a liquid.

16. An optical profiler comprising:
   an interferometric imaging system;
   an objective module including an objective coupled to said interferometric imaging system, said objective module being adapted to produce a test beam directed toward a sample surface and a reference beam directed toward a reference surface, and including means for producing substantial collimation of said reference beam as it impinges on the reference surface and of the test beam as it impinges on the sample surface;
   a compensating element placed along an optical path of said reference beam toward said reference surface, said compensating element being a separate component from the reference surface and having optical dispersive properties designed to substantially compensate corresponding dispersive properties of a dispersive element placed along an optical path of the test beam toward said sample surface; and an illumination module optically coupled to said objective module.

17. The profiler of claim 16, wherein said objective is corrected for aberrations produced by said dispersive element.

18. The profiler system of claim 17, wherein said objective module includes a beam-splitting element receiving a substantially collimated beam from said illumination module and producing said test and reference beams.

19. The profile of claim 16, wherein said objective module includes a pellicle to produce said test and reference beams.

20. The profiler of claim 16, wherein said illumination module is optically coupled to the objective module by an optical fiber.

21. The profiler of claim 16, wherein said objective is corrected for aberrations produced by said dispersive element; said objective module includes a beam-splitting element receiving a substantially collimated beam from said illumination module and producing said test and reference beams; said beam-splitting element includes a pellicle; and said illumination module is optically coupled to the objective module by an optical fiber.

22. The profiler of claim 16, wherein said compensating element is incorporated into a beam-splitting assembly that produces said test and reference beams, and said assembly comprises a pair of prisms sharing a face along a beam-splitting plane such that any displacement of either of said prisms along said plane produces a change in said optical properties designed to substantially compensate corresponding properties of said dispersive element.

23. The profiler of claim 22, wherein said prisms are half-cube prisms.

24. The profiler of claim 16, wherein said illumination module is optically coupled to said objective module through a beam-splitter reflecting an input beam toward said objective to produce substantially collimated reference and test beams.

25. The profiler of claim 22, wherein said illumination module is optically coupled to said objective module through a beam-splitter reflecting an input beam toward said objective to produce substantially collimated reference and test beams.

26. The optical profiler of claim 16, wherein said sample surface is a micro-electro-mechanical-systems device.

27. The optical profiler of claim 16, wherein said dispersive element includes a liquid.

28. A method of compensating for a protective dispersive element placed along an optical path of a test beam of an interferometric profiler, comprising the steps of:

providing an objective module including an objective coupled to an interferometric imaging system of the profiler, said objective module being adapted to produce said test beam directed toward a sample surface and a reference beam directed toward a reference surface;

providing a compensating element placed along an optical path of said reference beam toward said reference surface, said compensating element being a separate component from the reference surface and having optical dispersive properties designed to substantially compensate corresponding dispersive properties of said protective dispersive element; and producing substantial collimation of said reference beam as it impinges on the reference surface and of the test beam as it impinges on the sample surface.

29. The compensating method of claim 28, further including the step of correcting said objective for aberrations produced by said dispersive element.

30. The compensating method of claim 28, wherein said objective module includes a beam-splitting element receiving a substantially collimated beam from an illumination module and producing said test and reference beams.

31. The compensating method of claim 28, wherein said objective module includes a pellicle to produce said test and reference beams.

32. The compensating method of claim 28, wherein an illumination module is optically coupled to the objective module by an optical fiber.

33. The compensating method of claim 28, wherein said compensating element is incorporated into a pair of prisms sharing a face along a beam-splitting plane that produces said test and reference beams; and further including the step of displacing either of said prisms along said plane to produce a change in said optical properties of the compensating element to substantially compensate said corresponding properties of said dispersive element.

34. The compensating method of claim 33, wherein said prisms are half-cube prisms.

35. The compensating method of claim 33, further including the step of correcting said objective for aberrations produced by said dispersive element.

36. The method of claim 28, wherein said sample surface is a micro-electro-mechanical-systems device.

37. The method of claim 28, wherein said dispersive element includes a liquid.

* * * * *